(12) United States Patent
Marois et al.

(10) Patent No.: US 11,534,990 B2
(45) Date of Patent: Dec. 27, 2022

(54) METHOD FOR PRODUCING A ROTOR BLADE ROOT HALF AND A MANUFACTURING MOULD THEREFOR

(71) Applicant: TPI Technology Inc., Scottsdale, AZ (US)

(72) Inventors: Mathias Marois, Berlin (DE); Matthias Passow, Berlin (DE)

(73) Assignee: TPI Technology Inc., Scottsdale, AZ (US)

( * ) Notice: Subject to any disclaimer, the term of this patent is extended or adjusted under 35 U.S.C. 154(b) by 0 days.

(21) Appl. No.: 17/334,072

(22) Filed: May 28, 2021

(65) Prior Publication Data

US 2021/0283865 A1   Sep. 16, 2021

Related U.S. Application Data

(63) Continuation of application No. PCT/EP2019/083057, filed on Nov. 29, 2019.

(30) Foreign Application Priority Data

Nov. 30, 2018 (DE) .................... 10 2018 130 550.8

(51) Int. Cl.
  *B29C 70/44* (2006.01)
  *B28B 7/00* (2006.01)
  *B29L 31/08* (2006.01)

(52) U.S. Cl.
  CPC .......... *B29C 70/443* (2013.01); *B28B 7/0035* (2013.01); *B29L 2031/085* (2013.01)

(58) Field of Classification Search
  CPC ..... B29C 70/443; B29C 70/44; B28B 7/0035; B29L 2031/085; Y02E 10/72; Y02P 70/50
  See application file for complete search history.

(56) References Cited

U.S. PATENT DOCUMENTS

| 8,388,885 | B2 * | 3/2013 | Bansal | B29C 70/546 |
| | | | | 264/511 |
| 9,114,600 | B2 * | 8/2015 | Kulik | B29C 70/44 |
| 2007/0107220 | A1 * | 5/2007 | Bakhuis | B29C 70/086 |
| | | | | 29/889.7 |
| 2009/0273111 | A1 * | 11/2009 | Bansal | B29C 70/443 |
| | | | | 264/101 |
| 2012/0080142 | A1 | 4/2012 | Kulik et al. | |

FOREIGN PATENT DOCUMENTS

| DE | 102009056978 A1 | 6/2011 |
| DE | 102016014491 A1 | 6/2018 |

OTHER PUBLICATIONS

Machine Translation of Kaser, DE 10 2016014491A1, Jul. 6, 2018 (Year: 2018).*
Translation of International Search Report for International Application No. PCT/EP2019/083057 dated Feb. 20, 2020.

* cited by examiner

*Primary Examiner* — Ryan J. Walters
(74) *Attorney, Agent, or Firm* — Foley Hoag LLP; Stephen J. Kenny; Vincenzo DiMonaco

(57) ABSTRACT

The disclosure relates to a method for producing a component of a rotor blade in that a vacuum film (16) is placed on a positive mould (1), layers (17) are laid on the positive mold (1), a negative mould (3) is pivoted over the occupied positive mold (1), the vacuum film (16) is then sealed from the negative mould (3), a vacuum is then drawn against the negative mold (3), and the negative mould (3) together with the layers (17) is then pivoted back.

5 Claims, 2 Drawing Sheets

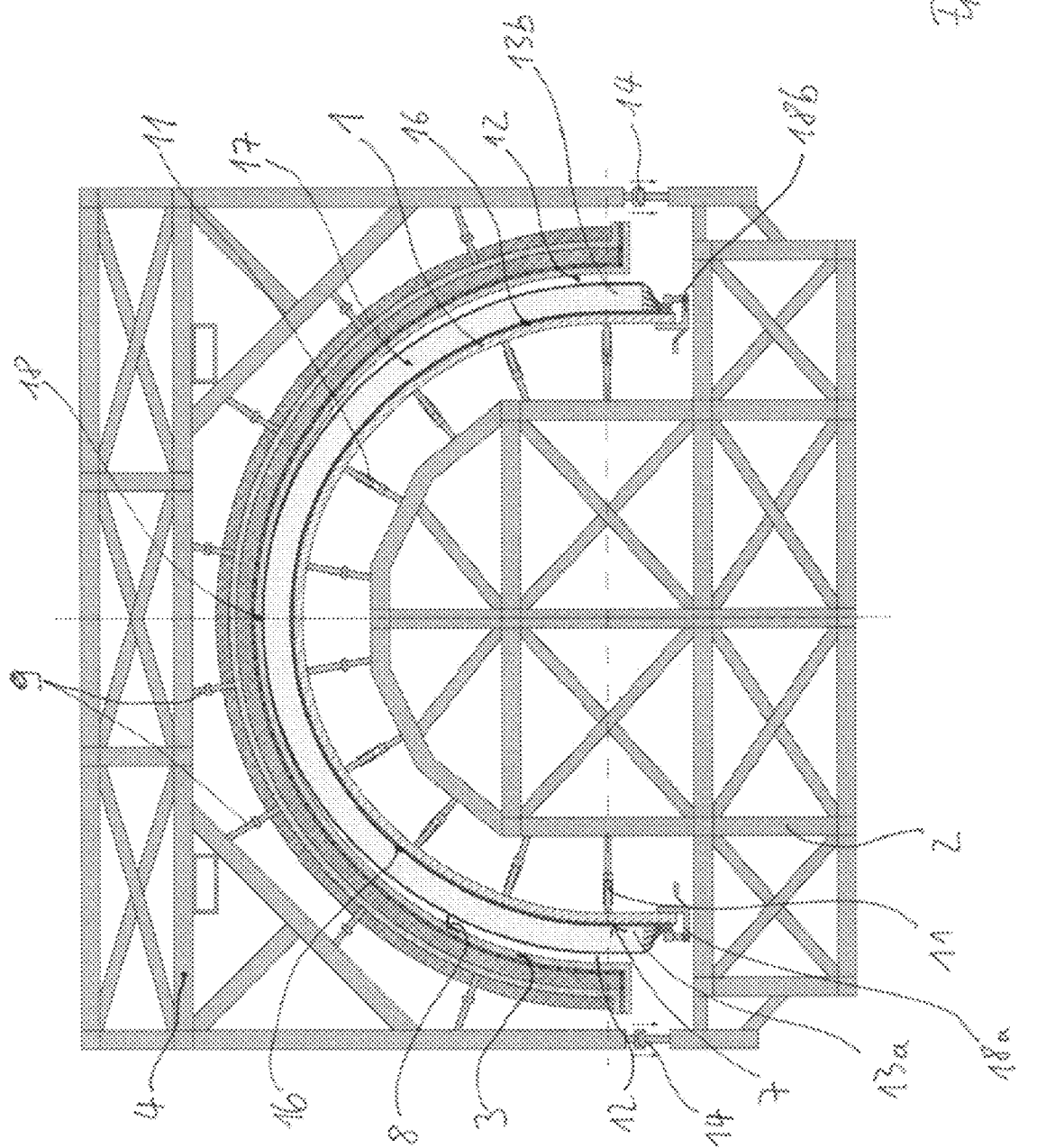

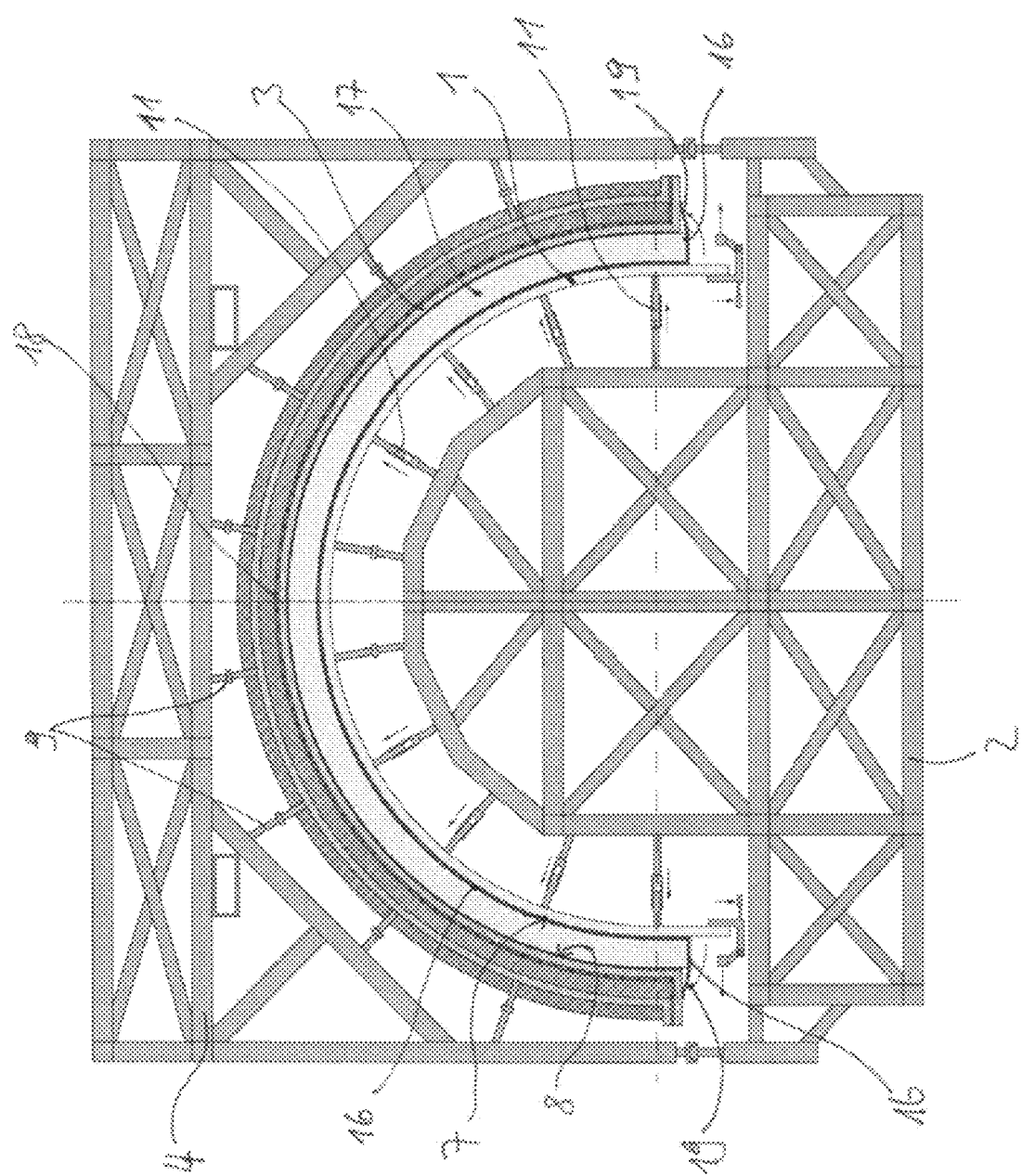

METHOD FOR PRODUCING A ROTOR BLADE ROOT HALF AND A MANUFACTURING MOULD THEREFOR

CROSS-REFERENCE TO RELATED APPLICATIONS

This application is a Continuation of and claims the benefit of priority under 35 USC 120 to PCT/EP2019/083057 filed Nov. 29, 2019, which claims priority to DE 10 2018 130 550.8 filed Nov. 30, 2018, the entire contents of each are hereby incorporated by reference.

The disclosure relates to a method for producing a component of a rotor blade. The disclosure also relates to a production mould for a component of a rotor blade.

Methods for producing rotor blade components as well as production moulds for carrying out such methods are of course well known in the prior art. For example, DE 10 201 5 007 977 A1 discloses a production mould for producing a rotor blade root of a rotor blade.

Conventionally, rotor blades are not produced in a single production mould, but components of the rotor blade such as the rotor blade half-shells, the rotor blade root as well as belts and webs are manufactured in separate production moulds and then placed one above the other and laminated and glued together in a separate vacuum infusion method (VARI) or lamination method.

In particular in the production of the rotor blade root, or a rotor blade half-root, the problem arises that the individual laid and/or woven layers which have to be laid one on top of the other for the laminate construction of the rotor blade half-root, in particular at the upper edges of the mould shell of the rotor blade half-root, have to be arranged almost perpendicularly. Since the bearing surface of the mould half shell runs almost perpendicularly on the upper edge, there is the risk that the laid layers, even if they are fastened to the edge, form a sag or at least waves form. The wave formation also remained in the subsequent lamination method, and the rotor blade root can no longer be installed in the rotor blade and would have to be sorted out because of a deficiency.

The object of the present disclosure is to provide an above mentioned method which makes it possible to produce components of a rotor blade without running the risk of wave formation.

It is also the object of the present disclosure to provide a manufacturing mould with which such a method can be carried out.

According to the disclosure, a vacuum film is applied to a positive mould, layers are applied to the vacuum film. The layers can be woven and/or laid fabric layers. The layers can be fibre-containing, for example glass fibres or carbon fibres. However, the layers can also be sandwich core materials, balsa wood or the like. The term "layer" is to be understood broadly here. The layers can extend over the entire vacuum film or cover only parts of the vacuum film. After the layers and possibly further process and auxiliary materials are laid on the vacuum film, a negative mould is pivoted over the occupied positive mould. The vacuum film is then sealed on the negative mould and a vacuum is drawn against the negative mould. Because the vacuum is drawn against the negative mould, the vacuum foil presses against the layers lying on it and presses the layers against the negative mould. As a result, the layers are sucked in a stable manner against the negative mould, and the negative mould can be pivoted back with the layers.

In a preferred embodiment of the method according to the disclosure, a first bearing surface of the positive shape is bent subnormally, and after the covering with the layers, the first bearing surface is rolled out from the inside to the outside into a normal shape. Preferably, the positive mould is formed semi-cylindrical, so that it has the first bearing surface, which is formed in a substantially semi-cylindrical manner, wherein the first bearing surface can be bent back and forth in a cross-section between a strict circular arc shape and an elliptical arc shape. Preferably, the positive shape is initially subnormal, i.e. here in cross-section elliptically curved to the effect that the lower, ground-side edges of the half-cylinder support surface are drawn or bent inwards so that the entire cross-section is bent out of the strict circular arc shape is bent into an elliptical shape with a greater curvature than the circular shape. The elliptical shape is referred to herein as being subnormal. On the subnormally bent positive shape, the layers are placed on top of each other and stacked as described above, and preferably, after the negative mould has been pivoted over the positive mold, the negative mold possibly comes into contact with the plies at an apex portion. A distance between positive and negative form is selected in the way that the layers follow the movements of the positive form, they can, but do not have to, be pressed into the negative mould. The positive form is moved from the inside to the outside, meaning it is rolled out from the apex section to the edge sections, and thus possible corrugations are forced out of the layer stack from the inside to the outside.

Preferably, the layers and the vacuum film are first firmly clamped to the positive mould. After the vacuum film and, if necessary, process layers have been placed on the positive mould as infusion auxiliary media and the layers have been placed on the vacuum film, the layers and the vacuum film are clamped along their lower, soil-side longitudinal edges on both sides of the positive mold at an edge section. After the layers and the vacuum film are clamped, the negative mould is lowered onto the layer stack until the negative mould on the apex section comes into contact with the layer stack, and subsequently the positive mould is rolled from the subnormal curved shape into the normal shape.

After the positive mould has been rolled out, the layers are in their nominal position, the layers are clamped between the first support surface and a second support surface of the negative mould, and the vacuum film is then released together with the layer stack on the edge section of the positive mould, and the film is folded over and adhesively bonded or clamped to the negative mould in an air-tight manner.

A vacuum is then drawn against the negative mould. As a result, the layers are soaked and compressed on the second support surface of the negative mould, and the negative mould can be pivoted back without moving the layers.

The object is achieved with regard to the manufacturing mould by an initially mentioned manufacturing mould having the features described herein.

The manufacturing mould according to the disclosure is suitable for carrying out each of the abovementioned processes, and vice versa, each of the abovementioned processes can be carried out with the above-mentioned or one of the production forms described below.

The manufacturing mould is suitable for producing a component of a rotor blade, in particular a rotor blade root or a rotor blade partial root. The manufacturing mould comprises a positive mould and a negative mould which can be pivoted via the positive mould, and a vacuum mechanism which can be actuated when the negative mould is pivoted via the positive mould.

The vacuum mechanism comprises a vacuum film, which can be sealed on the negative mould, and a suction mechanism, which suctions the air between a second support surface of the negative mould and the vacuum film. The vacuum mechanism can already be actuated when the production mould is arranged open at the bottom to the ground above the positive mould.

In a preferred embodiment of the manufacturing mould, the positive mould has a movable first bearing surface which can be rolled out from a subnormal shape to a normal shape from the inside to the outside.

For this purpose, positioning elements are preferably arranged along a cross-section of the positive mould, said positioning elements being connected to a central controller. The positioning elements are provided between the first support surface and a first frame and make it possible to bend the first support surface relative to the first frame and thus to adjust the cross-section between a subnormal shape, meaning a shape which is curved more than the half-cylindrical shape, and the normal shape, meaning the strictly semi-cylindrical shape, back and forth.

By subsequently actuating the positioning elements, preferably successively from an apex section to edge sections of the first support surface, a rolling movement is generated from the vertex to the edges, which forces possibly occurring waves in the layers to the edge.

Advantageously, a lifting and lowering system is arranged between the negative mould and the positive mould, with which a distance between the two molds can be adjusted. The positive mould comprises the first bearing surface and a first frame, the negative mould has a second bearing surface and a second frame. The lifting and lowering system is provided between the first and second frames preferably in the form of adjusting devices, pneumatic or hydraulic lifting cylinders or the like and makes it possible to move the first and second frames relative to one another. The first bearing surface is fixed or likewise adjustably arranged in relation to the first frame, and the second bearing surface is arranged in a fixed manner relative to the second frame, so that the first and second bearing surfaces can be adjusted relative to one another by means of a movement of the first and second frame relative to one another, so that between the two support surfaces the stack of layers arranged there for producing the rotor blade component can be held in its nominal position enclosed from both sides.

Advantageously, the positive mould has clamping devices for the layers and the vacuum film along edge sections, by means of which clamping devices lower layer edges and lower vacuum film edges can be temporarily clamped to the positive mould.

The disclosure is described with reference to an exemplary embodiment in two figures showing:

BRIEF DESCRIPTION OF THE DRAWINGS

FIG. 1 is a sectional view of a manufacturing mould according to the present disclosure with a subnormally bent positive mould and a negative mould arranged above the positive mould;

FIG. 2 shows the manufacturing mould in FIG. 1 with a normally curved positive mould and a negative mould arranged above the positive mould.

The manufacturing mould according to the disclosure comprises a positive mould 1, which is fastened to a first frame 2, and a negative mould 3, which is fastened to a second frame 4. Here, the first and the second frame 2, 4 are connected in an articulated manner with respect to one another in such a way that the negative mould 3, as shown in FIG. 1 can be folded over the positive mould 1 in the folded-up state and, in the unfolded state, can be folded around a joint (not shown) next to the first frame 2 and the positive mould 1. However, other types of construction e.g. resolved constructions, are also conceivable, in which the negative mould 3 can be lifted over the positive mould by means of a crane or other lifting means.

The positive mould 1 has a first bearing surface 7 which is cylindrical in shape. A cross-section of the cylinder surface can be continuously adjusted between the strict circular arc shape and an elliptical shape.

The negative mould 3 has a second bearing surface 8 which is cylindrically formed. The second support surface 8 does not need to be adjustable in its curvature in cross-section. The negative mould 3 is fastened in a positionally fixed manner to the second frame 4 by means of spacers 9. Alternatively, the spacers 9 can also be adjustable in length.

The positive mould 1, on the other hand, is adjustably connected to the first frame 2 via hydraulically, electrically or pneumatically adjustable positioning elements 1, in such a way that by moving the adjustable positioning elements 11 in and out, as shown in FIG. 1, the first support surface 7 is moved out of its exact shape, which is circular in cross-section, into an elliptical shape, so that an enlarged gap 12 is formed between the positive mould 1 and the negative mould 3. At their respective position, the positioning elements 11 adjust a distance between the first support surface 7 and the first frame 2; at other positions, the distance between the first support surface 7 and the first frame 2 remains the same.

FIG. 1 shows that the adjustable positioning elements 11 are arranged along the apex section 18 and along two lower edge sections 13a, 13b of the positive mould 1. The positioning elements 11 are extended in a controlled manner from the apex section 18 to the edge sections and the layers 17 are thereby rolled out. The first and the second frame 2, 4 can be moved relative to one another via a lifting and lowering system 14 which acts between the first and second frames 2, 4.

The manufacturing mould according to the disclosure is particularly suitable for producing prefabricated rotor blade roots which are subsequently installed in rotor blades. In order to produce the prefabricated components, so-called prefabs, the production mould according to the disclosure is suitable for use with respect to rotor blade roots. In other variations, the manufacturing mould may also be used to manufacture other prefabs.

The positive mould 1 is arranged on the first frame 2. The first bearing surface 7 of the positive mould 1 is formed semi-cylindrically, the first bearing surface 7 being adjustable in its cross-section and being adjustable from the exactly circular-arc-shaped cross-sectional shape into an elliptical cross-sectional shape with the inwardly drawn lower edge sections 13a, 13b. The positive mould 1 consists of a thin laminate which is flexible or also of sheet metal or other suitable materials.

In order to produce half the root of the rotor blade, a vacuum film 16, which preferably completely covers the first support surface 7, is first placed directly on the first support surface 7 on the positive mould 1.

Different woven and/or laid layers 17 are applied to the vacuum film 16 one above the other or adjacent to one another. These may be glass-fiber-containing layers, carbon-fiber-containing layers, textile fabric layers or the like. The woven and/or laid fabric layers 17 cover the first support surface 7 preferably also completely. Its lateral edge is provided on both longitudinal sides of the first support surface 7 with a respective clamp 18a, 18b firmly clamped. The woven and/or laid fabric layers 17 are thus stacked one on top of the other, firmly clamped at their lateral edges and arranged in a non-slip manner on the first support surface 7. After the sequence of woven and/or laid layers 17 is completed in order to form the rotor blade root prefabs, the negative mould 3 is pivoted via the positive mould 1 by means of the pivoting mechanism and lowered to such an extent by means of the lifting and lowering system 14 until a contact between the second support surface 8 of the negative mould 3 and the stack of the woven and/or laid layers 17 comes about at the apex section of the positive and negative mould 1, 3 arranged one above the other. This position is illustrated in FIG. 1.

Subsequently, the positive mould 1 is rolled out both to the left and to the right edge section 13a, 13b, meaning that the positioning elements 11 are extended from the upper positioning elements one after the other to the lower positioning elements 11 in order to bend the first support surface 7 from the subnormal elliptical shape into a normal circular shape. In this case, however, care is taken that a contact of the second bearing surface with the stack of woven and/or laid layers 17 runs continuously downward from a vertex section 18 to the two edge sections 13a, 13b. As a result of the rolling movement, it is ensured that no waves are formed in the layer structure, but rather possible waves press out from the apex section 18 towards the edge sections 13a, 13b.

After the first support surface 7 has also assumed an exactly circular arc-shaped configuration and the second support surface 8, which is distributed over the entire second support surface 8, rests on the structure of woven and/or laid layers 17, the clamps 18a, 18b of the positive mould 1 are released, and the vacuum film 16 is released and folded over and is air-tightly secured to the negative mould 3 by means of an adhesive tape 19 or the like. The described state is shown in FIG. 2. Identical reference numerals indicate the same features in FIG. 2.

In a subsequent step, the negative mould 3 is swivelled again and the production mould is unfolded, so that the negative mould 3 is arranged next to the positive mould 1 in an upwardly open arrangement and the structure of woven and/or laid layers 17 is accessible from above in a conventional manner. Before pivoting, a vacuum is drawn against the negative mould 3. As a result, the woven and/or laid fabric layers 17 can then be pivoted in a movement-stable manner with respect to the second supporting surface 8.

After the negative mould 3 has been pivoted, an infusion method is carried out in a conventional manner in a layer structure of the woven and/or laid layers 17, which forms over the negative mould 3, and a rotor blade half-root is produced. The rotor blade half-root is then inserted as a prefab into a rotor blade half-shell and is connected to further components such as belts, webs or the like to the rotor blade half-shell. The two rotor blade half-shells are then likewise pivoted over one another by means of a pivotable production mould and bonded to form a rotor blade.

The production mould according to the disclosure has, in particular, a central control (not shown) for the positioning elements 11 which bend the shape of the first support surface 7.

LIST OF REFERENCE CHARACTERS

1 Positive form
2 First frame
3 Negative form
4 Second frame
7 first support surface
8 second support surface
9 Spacer
11 Positioning elements
12 Gap
13 a Lower edge section
13 b Lower edge section
14 Lifting and lowering system
16 Vacuum film
17 Woven and/or laid layers
18 Apex section
18 a Clip
18 b Clip
19 Adhesive tape

The invention claimed is:

1. A method of manufacturing a component of a rotor blade comprising:
    placing a vacuum film (16) on a positive mould, whereby layers (17) are placed on the positive mould, the positive mould comprising an elliptical shape;
    pivoting a negative mould (3) from a first position to a second position over the positive mould;
    rolling the positive mould from the elliptical shape to a semi-cylindrical shape with the layers (17) placed thereon;
    sealing the vacuum film (16) on the negative mould (3);
    drawing a vacuum against the negative mould (3); and
    pivoting the negative mould (3) back to the first position with the layers (17).

2. The method of claim 1, further including lowering the negative mould (3) onto the positive mould.

3. The method of claim 1, wherein rolling the positive mould from the elliptical shape to the semi-cylindrical shape comprises rolling the positive mould from an apex section of the positive mould to an edge section of the positive mould with the layers (17) placed thereon.

4. The method of claim 1, wherein the layers (17) and the vacuum film (16) are clamped in place on the positive mould.

5. The method of claim 1, wherein an infusion method is carried out.

* * * * *